United States Patent
Kishi et al.

(10) Patent No.: US 7,603,049 B2
(45) Date of Patent: Oct. 13, 2009

(54) IMAGE FORMATION APPARATUS AND ASSOCIATED METHOD OF STORING POWER

(75) Inventors: Kazuhito Kishi, Kanagawa (JP);
Susumu Matsusaka, Kanagawa (JP);
Yasuhisa Kato, Kanagawa (JP);
Akiyasu Amita, Kanagawa (JP);
Masami Okamoto, Kanagawa (JP);
Yasutada Tsukioka, Chiba (JP);
Hiromasa Takagi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 496 days.

(21) Appl. No.: 11/047,686

(22) Filed: Feb. 2, 2005

(65) Prior Publication Data

US 2005/0191078 A1 Sep. 1, 2005

(30) Foreign Application Priority Data

Feb. 4, 2004 (JP) .............................. 2004-027796

(51) Int. Cl.
*G03G 15/00* (2006.01)
(52) U.S. Cl. ........................................................ 399/88
(58) Field of Classification Search .................. 399/88, 399/89
See application file for complete search history.

(56) References Cited

U.S. PATENT DOCUMENTS

| | | | |
|---|---|---|---|
| 5,670,915 A * | 9/1997 | Cooper et al. | 331/111 |
| 5,854,465 A | 12/1998 | Kishi et al. | |
| 5,913,085 A * | 6/1999 | Yamaguchi et al. | 396/205 |
| 6,542,705 B2 | 4/2003 | Fujita et al. | |
| 2004/0022552 A1 | 2/2004 | Yura et al. | |
| 2004/0245235 A1 | 12/2004 | Kishi et al. | |
| 2005/0191078 A1 | 9/2005 | Kishi et al. | |

FOREIGN PATENT DOCUMENTS

JP 2001-66926 3/2001

OTHER PUBLICATIONS

JP2004-287007A—computer translation.*
U.S. Appl. No. 11/049,718, filed Feb. 4, 2005, Matsusaka et al.
U.S. Appl. No. 11/047,686, filed Feb. 2, 2005, Kishi et al.
U.S. Appl. No. 11/221,838, filed Sep. 9, 2005, Kishi et al.
U.S. Appl. No. 11/208,758, filed Aug. 23, 2005, Kishi et al.
U.S. Appl. No. 11/220,582, filed Sep. 8, 2005, Matsusaka et al.
U.S. Appl. No. 11/208,753, filed Aug. 23, 2005, Kishi et al.
U.S. Appl. No. 11/220,621, filed Sep. 8, 2005, Kishi et al.

(Continued)

*Primary Examiner*—Quana M Grainger
(74) *Attorney, Agent, or Firm*—Oblon, Spivak, McClelland, Maier & Neustadt, L.L.P.

(57) ABSTRACT

A power storage apparatus is disclosed, which includes a charge-able and discharge-able capacitor unit, discharged power being supplied to an electrical load. The power storage apparatus includes a detection unit configured to determine whether an amount of power stored by the capacitor unit falls less than a predetermined magnitude at a predetermined voltage. Degradation of the power storage apparatus is determined based on a detection result of the detection unit, and a setting value concerning charging and discharging is adjusted.

11 Claims, 7 Drawing Sheets

OTHER PUBLICATIONS

U.S. Appl. No. 11/220,686, filed Sep. 8, 2005, Matsusaka et al.
U.S. Appl. No. 11/283,828, filed Nov. 22, 2005, Okamoto.
U.S. Appl. No. 11/405,448, Apr. 18, 2006, Kishi et al.
U.S. Appl. No. 11/522,324, filed Sep. 18, 2006, Semma, et al.
U.S. Appl. No. 11/554,944 filed Oct. 31, 2006, Yano, et al.
U.S. Appl. No. 11/678,854, filed Feb. 26, 2007, Yano, et al.
U.S. Appl. No. 11/609,467, filed Dec. 12, 2006, Kishi, et al.

* cited by examiner

IMAGE FORMATION APPARATUS AND ASSOCIATED METHOD OF STORING POWER

BACKGROUND OF THE INVENTION

1. Field of the Invention

The present invention generally relates to a power storage apparatus that can be charged, and can supply power to a load, a fixing apparatus serving as the load of the supplied power, and an image formation apparatus equipped with the fixing apparatus, such as a copying machine, a printer, a facsimile apparatus, and a multifunctional machine capable of any combination of copying, printing, and facsimile operations.

2. Description of the Related Art

Conventionally, a technology of providing an auxiliary power storage apparatus in addition to a main power supply has been known (for example, Patent Reference 1). The technology aims at improving operability of the image formation apparatus by shortening a time required for the temperature of the fixing apparatus to rise when starting operations, the image formation apparatus using electrophotography methods. The technology also aims at reducing the power consumption of the fixing apparatus for energy savings.

The fixing apparatus is usually constituted by a fixing roller that includes a heating member, and a pressurization roller that contacts the fixing roller with pressure.

In the image formation apparatus, a toner image is formed on the surface of a recording medium that is conveyed along a conveyance path of the image formation apparatus. The recording medium that supports and carries the toner image, which toner image is yet to be fixed, further travels along the conveyance path at a predetermined conveyance speed, and reaches the fixing apparatus. Then, the recording medium travels between the fixing roller and the pressurization roller (called a nip), the fixing roller applies heat to the recording medium, and both rollers apply pressure to the recording medium such that the toner image is fixed. The recording medium carrying the fixed image is sent out from the nip, and is discharged from the image formation apparatus.

The image formation apparatus includes a main power supply that is connected to commercial main power, and provides power to loads, such as the fixing apparatus, of the image formation apparatus. In addition to the main power supply, the image formation apparatus includes an auxiliary power supply consisting of a power storage apparatus that provides auxiliary power by discharging stored power to the fixing apparatus as required.

The power storage apparatus includes one or more capacitor units (cell units) that are capable of charging and discharging, a switching unit that switches between charging and discharging states of the capacitor units, a converting unit that rectifies alternating current power (AC) provided from the commercial main power supply into direct current (DC) power, the DC power being provided to the capacitor units, devices, such as a FET, and connection terminals for providing power to the loads, all of which are electrically connected as required.

When the main power supply of the image formation apparatus is turned on (i.e., when the image formation apparatus is started), while the main power supply connected to the commercial main power supplies power to the fixing apparatus, the power storage apparatus serving as the auxiliary power supply also supplies power to the fixing apparatus. Accordingly, power that is greater than rated (e.g., 100V 15 A of the commercial main power) can be provided to the fixing apparatus, the power supplied by the power storage apparatus being added in. In this manner, the fixing roller can reach a desired temperature (fixing temperature) in a short time. Therefore, the image formation apparatus can become operational in a short time even after the main power has been disconnected for a long time, and the temperature of the fixing roller can be held low during a standby mode. In this way, the operability of the image formation apparatus is improved; and since the temperature of the fixing roller can be set up lower while in standby, the power consumption of the image formation apparatus is reduced.

Further, in addition to when the image formation apparatus is to start up initially, when there is great power consumption (for example, when image formation is continuously performed, when a document reading unit is operating, and when resuming operation after a prolonged standby state), the power storage apparatus provides the additional power to the fixing apparatus. In the cases such as exemplified above, the power storage apparatus supplements the insufficient power provided from the main power supply to the fixing apparatus. In this manner, stable and sufficient power is provided to the fixing roller of the fixing apparatus irrespective of the operation modes of the image formation apparatus, and the fixing temperature of the fixing roller can be properly maintained. Accordingly, even if the heat capacity of the fixing roller is small, the time required for the fixing roller to reach the operational temperature can be shortened while the fixing nature of an output image is always maintained at a proper level. In this manner, the fixing temperature while at standby can be lowered, the standby power consumption can be reduced, the heat dissipation loss is reduced, and as a result, energy savings are attained.

In addition, the capacitor unit of the power storage apparatus can be charged at any time as required after the image formation apparatus is started, when the image formation apparatus is operating at power less than the power available from the main power, and a part of the main power can be supplied to the power storage apparatus.

[Patent reference 1] JPA, 2001-66926

DESCRIPTION OF THE INVENTION

Problem(s) To Be Solved By the Invention

Conventionally, when the capacitor unit is degraded with the passage of time, the power (discharging power) that can be supplied to the fixing apparatus becomes insufficient, and the power storage apparatus cannot perform as desired. In this case, problems are in that it takes more time for the temperature of the fixing apparatus to rise, the fixing nature of the fixing apparatus is degraded, and the energy savings of the fixing apparatus cannot be attained.

The problems are common to generic power storage apparatuses, not being peculiar to the power storage apparatus for supplying the auxiliary power to the fixing apparatus of the image formation apparatus. That is, when the capacitor unit of the power storage apparatus is degraded, generally, power that can be provided to the load runs short, and the function the power storage apparatus is not attained as desired.

SUMMARY OF THE INVENTION

It is a general object of the present invention to provide a power storage apparatus, a fixing apparatus therewith, and an image formation apparatus therewith that substantially obviate one or more of the problems caused by the limitations and disadvantages of the related art, the power storage apparatus of the present invention properly detecting a status of degradation of a capacitor unit of the power storage apparatus.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a power storage apparatus, a fixing apparatus therewith, and an image formation apparatus therewith particularly pointed out in the specification in such full, clear, concise, and exact terms as to enable a person having ordinary skill in the art to practice the invention.

To achieve these and other advantages and in accordance with the purpose of the invention, as embodied and broadly described herein, the inventors hereto have determined after research as follows.

That is, when the capacitor unit of the power storage apparatus is degraded, main phenomena are that its electrostatic capacity falls, and that its internal resistance increases. When the electrostatic capacity of the capacitor unit falls, power discharged from the capacitor unit declines. When the internal resistance of the capacitor unit increases, a part of the power is consumed inside the capacitor unit, and the power available to the fixing apparatus declines.

Specifically, if the power storage apparatus is controlled for constant-current charging or constant power charging, a charge time and discharge time for the same voltage of a degraded capacitor unit become shorter than those in early stages of the service life of the capacitor unit.

The present invention is based on the knowledge as described above.

To achieve these and other advantages and in accordance with the purpose of the invention, as embodied and broadly described herein, the invention provides as follows.

An aspect of the present invention provides a power storage apparatus that includes a capacitor unit that is capable of being charged and discharging, discharged power being provided to a load, and a detection unit that detects that power stored by the capacitor unit falls below a predetermined level at a predetermined voltage.

Another aspect of the present invention provides the power storage apparatus, wherein the above-mentioned detection unit serves as a degradation detection unit that detects degradation of the power storage apparatus.

Another aspect of the present invention provides the power storage apparatus, wherein the detection unit includes a voltage detection unit to detect the voltage of the above-mentioned capacitor unit, and a time detection unit to measure an elapse of time.

According to another aspect of the present invention, the power storage apparatus includes an adjustment unit configured to adjust setting values concerning charging and discharging of the above-mentioned capacitor unit based on a result of the detection by the above-mentioned detection unit.

Another aspect of the present invention provides the power storage apparatus, wherein controls are carried out such that discharging is made possible when a charged voltage becomes greater than a predetermined value for a discharge start, and the above-mentioned adjustment unit increases a setting value of the above-mentioned discharge starting voltage, when the above-mentioned power is determined to be below a predetermined value.

Another aspect of the present invention provides the power storage apparatus, wherein the discharge starting voltage is adjusted to be no greater than a withstand voltage of the power storage apparatus.

Another aspect of the present invention provides the power storage apparatus, wherein discharge is stopped when a discharging voltage becomes below a predetermined value for stopping discharge, and the above-mentioned adjustment unit reduces the value the above-mentioned discharge stopping voltage, when the above-mentioned detection unit detects that the above-mentioned power becomes below a predetermined value.

Another aspect of the present invention provides the power storage apparatus, wherein the discharge stopping voltage is set at no less than a reverse potential generating voltage of the power storage apparatus.

Another aspect of the present invention provides the power storage apparatus, wherein charging is controlled so that the charging voltage reaches a predetermined target charge voltage, and the above-mentioned adjustment unit raises the predetermined target charge voltage, when the detection unit detects that the power becomes below the predetermined value.

Another aspect of the present invention provides the power storage apparatus, wherein the above-mentioned target charge voltage is adjusted no greater than the withstand voltage.

Another aspect of the present invention provides the power storage apparatus, wherein the detection unit determines that the power is below the predetermined value by determining whether one of a period between a first charging voltage and a second charging voltage, and a period between a first discharging voltage and a second discharging voltage, is less than a predetermined period.

Another aspect of the present invention provides the power storage apparatus, wherein the power is determined to be below a predetermined value by determining whether one of a charging voltage change and a discharging voltage change in a predetermined period is greater than a predetermined value.

Another aspect of the present invention provides the power storage apparatus, wherein degradation of the capacitor unit is determined by the detection unit detecting that the power falls below the predetermined value under the predetermined voltage, and in consideration of information concerning an operating environment.

Another aspect of the present invention provides the power storage apparatus, wherein degradation of the capacitor unit is determined by the detection unit detecting that the power falls below the predetermined value under the predetermined voltage two or more times.

Another aspect of the present invention provides the power storage apparatus, wherein a load, to which the power storage apparatus provides power, is a heating member.

Another aspect of the present invention provides the power storage apparatus, wherein the heating member is installed in a fixing apparatus that heats a toner image on a recording medium such that the toner image is fixed to the recording medium.

Another aspect of the present invention provides the fixing apparatus configured to fix the toner image to the recording medium by heating the toner image on the recording medium, the fixing apparatus being configured to receive power from the power storage apparatus of the present invention.

Another aspect of the present invention provides the image formation apparatus that includes the power storage apparatus of the present invention.

Another aspect of the present invention provides the image formation apparatus that includes a display unit that is configured to display a message that the power storage apparatus is degraded, when the detection unit detects that the power becomes below the predetermined value.

Another aspect of the present invention provides the image formation apparatus that includes an operating unit capable of adjusting the setting value concerning charging and discharging of the capacitor unit by an external input based on the displayed message.

Another aspect of the present invention provides the image formation apparatus that includes the fixing apparatus configured to thermally fix the toner image to the recording medium, and the power storage apparatus configured to provide power to the image formation apparatus.

Another aspect of the present invention provides the image formation apparatus that includes a changing unit that changes the number of sheets of the recording medium that are continuously conveyed to the fixing apparatus per unit time, and the changing unit reduces the number of sheets to be conveyed per the unit time when the detection unit detects that the power becomes below the predetermined value.

Another aspect of the present invention provides the image formation apparatus, wherein the changing unit reduces the conveyance number of sheets per the unit time by increasing intervals between conveyances of the sheets of the recording medium.

Another aspect of the present invention provides the image formation apparatus, wherein the changing unit reduces the conveyance number of sheets per the unit time by reducing the speed of the conveyance.

Here, in this specification of the present invention,

"charge power" represents the electrical energy stored in the power storage apparatus when charging, and "discharge power" represents the electrical energy discharged from the power storage apparatus when discharging.

Further,

"power of charge power (charge power amount)" represents a product of the charge power and charge time, and is a synonym of "stored power". Similarly, "power of discharge power (discharge power amount)" represents a product of the discharge power and discharge time. Accordingly, in the case that the power storage apparatus is charged by constant current control or constant power control, the charge power amount is small if the charge time for reaching a predetermined charging voltage is short, and the discharge power amount is small if the discharge time from a predetermined discharging voltage is short.

EFFECT OF THE INVENTION

According to the present invention, it is detected whether the stored power of the capacitor unit becomes below the predetermined value at a predetermined voltage. In this manner, the present invention provides the power storage apparatus, the fixing apparatus, and the image formation apparatus that can detect degradation of the capacitor unit.

DESCRIPTION OF THE PREFERRED EMBODIMENTS

In the following, embodiments of the present invention are described with reference to the accompanying drawings. In the drawings, the same reference numbers indicate the same or corresponding components, and explanations thereof are not repeated, except that simplified explanations may be presented.

Embodiment 1

In the following, Embodiment 1 of the present invention is described with reference to FIG. 1 through FIG. 5.

First, the overall structure and operations of a copying machine 1 serving as the image formation apparatus 1 are described with reference to FIG. 1.

The image formation apparatus 1 includes a document reading unit 2 that optically reads image information of a document D, an exposure unit 3 that irradiates an exposure light L to a photo conductor drum 5 based on the image information read by the document reading unit 2, an imaging unit 4 that forms a toner image on the photo conductor drum 5, an imprint unit 7 that imprints the toner image formed on the photo conductor drum 5 to a recording medium P, a document conveyance unit (ADF) 10 that conveys the document D to the document reading unit 2, feed units 12, 13, and 14 that store recording media P such as sheets of imprint paper, a fixing apparatus 20 that fixes the toner image to the recording medium P, a fixing roller 21 that is installed in the fixing apparatus 20, a pressurization roller 24 that is installed in the fixing apparatus 20, a main power supply 40 that supplies power to the fixing apparatus 20 and the like, and a power storage apparatus 41 that supplies auxiliary power to the fixing apparatus 20.

Figure 1:
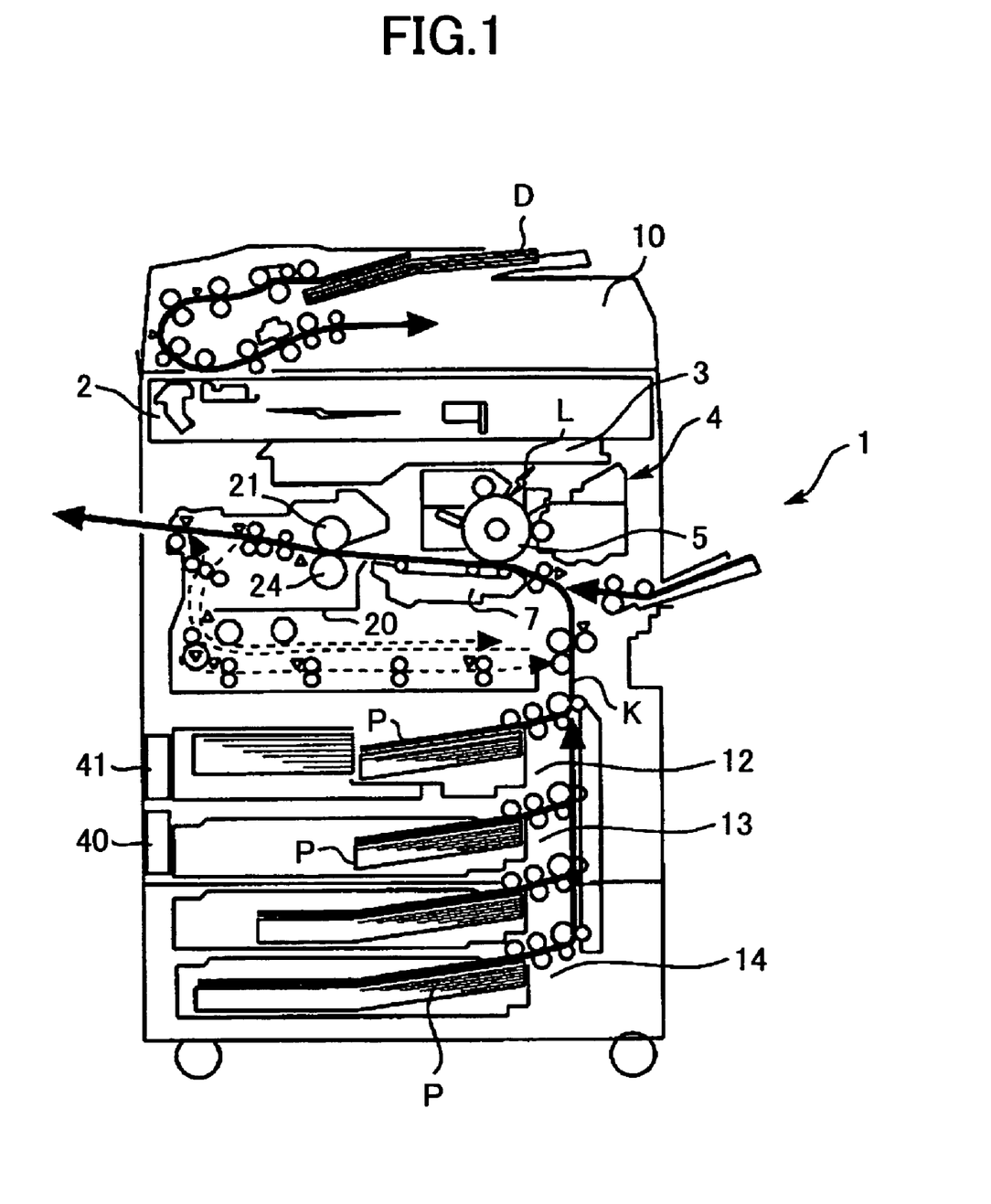
FIG. 1 is an overall diagram showing an image formation apparatus according to the first embodiment of the present invention.

With reference to FIG. 1, operations of normal image formation by the image formation apparatus are explained.

First, the document D is conveyed in the direction of an arrow in FIG. 1 by the conveyance roller of the document conveyance unit 10 from a document stand, and passes on the top of the document reading unit 2. At this time, the document reading unit 2 optically reads image information of the document D.

Then, the optical image information read by the document reading unit 2 is converted into an electrical signal, and is provided to the exposure unit 3 (write-in unit). Then, the exposure unit 3 emits the exposure light L, such as a laser beam, based on the electrical signal representing the image information, the exposure light L being emitted to the photo conductor drum 5 of the imaging unit 4.

On the other hand, in the imaging unit 4, the photo conductor drum 5 rotates clockwise as shown in FIG. 1, and the toner image corresponding to the image information is formed on the photo conductor drum 5 through predetermined imaging processes (an electrification process, an exposure process, a development process, and the like).

Then, the imprint unit 7 imprints the toner image formed on the photo conductor drum 5 on the recording medium P conveyed by the resist roller.

Further, operations concerning the recording medium P being conveyed to the imprint unit 7 are as follows.

First, one of the feed units 12, 13, and 14 is chosen either automatically or manually. In the following, the feed unit 12 is assumed as being chosen.

The top sheet of the recording medium P stored by the feed unit 12 is conveyed toward the position of a conveyance path K.

Then, the recording medium P passes the conveyance path K, and arrives at the position of a resist roller. Then, the recording medium P that arrives at the position of the resist roller waits for a proper timing such that the timing and position match with the toner image formed on the photo conductor drum 5, and travels again toward the imprint unit 7.

The recording medium P after the imprint process reaches the fixing apparatus 20 through the conveyance path K, after passing through the position of the imprint unit 7. The recording medium P that reaches the fixing apparatus 20 is fed between the fixing roller 21 and the pressurization roller 24, and the toner image is fixed by heat received from the fixing roller 21 and pressure received from both fixing roller 21 and pressurization roller 24. The recording medium P, on which the image is fixed, is sent out from between the fixing roller 21 and the pressurization roller 24 and is discharged from the image formation apparatus 1.

In this way, the image formation processes are completed.

Next, the structure and operations of the fixing apparatus 20 installed in the image formation apparatus 1 are explained in detail with reference to FIG. 2.

Figure 2:
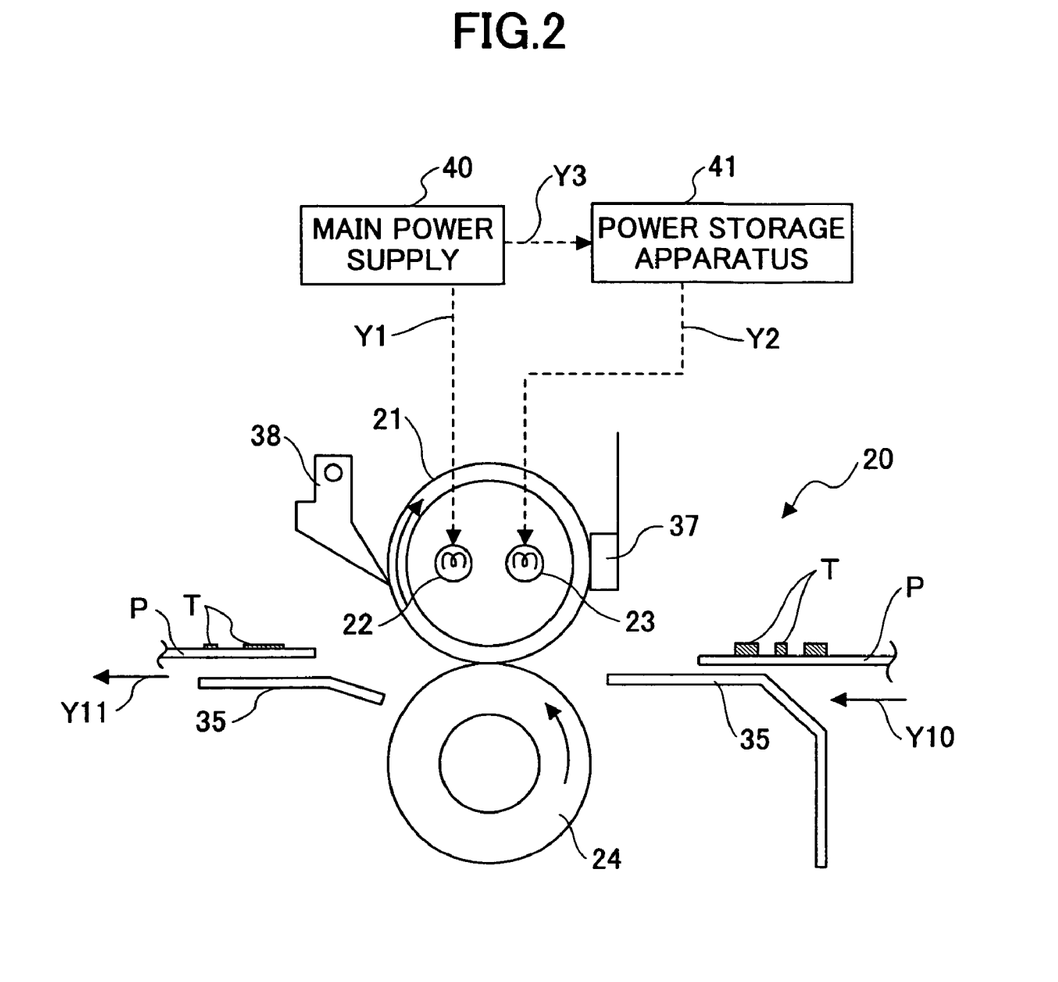
FIG. 2 is a cross-sectional drawing showing a fixing apparatus of the image formation apparatus of FIG. 1.

As shown in FIG. 2, the fixing apparatus 20 includes a thermistor 37, a separation nail 38, and a guide board 35 in addition to the fixing roller 21, the pressurization roller 24.

Here, the fixing roller 21 is constituted by a thin-walled cylinder that rotates in the direction of an arrow shown in FIG. 2, and two heaters 22 and 23 that serve as heating members and are fixed inside the thin-walled cylinder. The surface of the thin-walled cylinder of the fixing roller 21 is fluorocarbon-resin processed such that the mold-release characteristic of toner T is obtained. The heaters 22 and 23 of the fixing roller 21 are cylindrical heaters, each of which has a heating wire inside, with both ends being fixed to side plates of the fixing apparatus 20. The heaters 22 and 23, to which electric power is provided, apply heat to the thin-walled cylinder, which heat is then applied to the toner T on the recording medium P from the surface of the thin-walled cylinder.

Here, the main power supply 40 supplies power to the heater 22 (as indicated by a dotted line arrow Y1), and the power storage apparatus 41 supplies power to the heater 23 (as indicated by a dotted line arrow Y2). Further details are described below.

Further, the thermistor 37 is provided so as to contact the surface of the fixing roller 21 such that the temperature of the surface of the fixing roller 21 is measured. Magnitudes of power provided from the main power supply 40 and the power storage apparatus 41 are adjusted based on the roller surface temperature measured by the thermistor 37.

Further, as shown in FIG. 2, the separation nail 38 is arranged rocking-free, touching the surface of the fixing roller 21. The tip of the separation nail 38 touches the surface of the fixing roller 21 such that winding (coiling) of the recording medium P around the fixing roller 21 along with rotation of the fixing roller 21 is prevented from occurring, the recording medium P being sent out from between the fixing roller 21 and the pressurization roller 24.

Here, the pressurization roller 24 that contacts and pressures the fixing roller 21 (through a pressurization mechanism that is not illustrated) is structured by a core metal, and two or more elastic layers formed around the perimeter of the core metal through an adhesion layer. The elastic layers of the pressurization roller 24 are 1 through 10 mm thick, and are made of a fluororubber, silicone rubber, foaming silicone rubber, etc. A mold release layer, thickness of which is 300 micrometers or less, is prepared on the surface of the elastic layers. The mold release layer is made of poly-imide, polyether imide, PES (polyether sulphide), PFA (4 fluoride ethylene perfuloro arkyl vinyl ether copolymer resin), etc.

Further, guide boards 35 are arranged on the entrance and the exit sides of the nip constituted by the fixing roller 21 and the pressurization roller 24 such that the recording medium P is properly guided for proper conveyance. The guide boards 35 are fixed to the side plate of the fixing apparatus 20.

The fixing apparatus 20 as described above operates as follows.

First, when a main power switch of the image formation apparatus 1 is turned on, the main power supply 40 and the power storage apparatus 41 of the image formation apparatus 1 start supplying power to the heaters 22 and 23, respectively, of the fixing roller 21. Specifically, the main power supply 40 supplies power to the heater 22, the power being based on the rated commercial main power supplied from a socket that is outside of the image formation apparatus 1, and the power storage apparatus 41 discharges and supplies power to the heater 23.

In this manner, the surface of the fixing roller 21 reaches a desired temperature (for example, 180 degrees C.) in a short time, and the image formation apparatus 1 becomes operational.

When the image formation apparatus 1 is operational, and a user pushes a copy start button, the fixing roller 21 and the pressurization roller 24 start rotating, being driven by a drive unit (not illustrated) in the directions of the arrows in FIG. 2. The imaging processes as described above are performed such that the recording medium P carrying the toner image T is guided by the guide boards 35, the recording medium P carrying the toner image T is fed between the fixing roller 21 and the pressurization roller 24 (movement in the direction of arrow Y10), the toner image T is fixed to the recording medium P by the heat received from the fixing roller 21 and the pressure received from both fixing roller 21 and pressurization roller 24, and the recording medium P is discharged from between the fixing roller 21 and the pressurization rollers 24 (movement in the direction of arrow Y11).

Further, when the image formation apparatus 1 is consuming high power, the power storage apparatus 41 supplies power to the heater 23.

Specifically, for example, when the document reading unit 2 is performing a scanning operation, the power consumption increases as compared with the time when the scanning operation is not performed, and the power storage apparatus 41 supplies power to the heater 23. Further, when image formation is continuously performed, and the heat of the fixing roller 21 is taken by the recording media P that are continuously conveyed, the power storage apparatus 41 also supplies power to the heater 23. Further, when the image formation apparatus 1 resumes operating after a prolonged standby state while the energy-saving mode functions and the temperature of the fixing roller 40 has become low, the power storage apparatus 41 also supplies power to the heater 23. In this manner, insufficiency of the power provided to the fixing apparatus 20 from the main power supply 40 is supplemented by discharge power of the power storage apparatus 41.

When the temperature of the fixing roller 40 is stabilized at about a saturation state, a small amount of power is intermittently supplied from the main power supply 40 to the heater 22, and the power from the power storage apparatus 41 to the heater 23 is not necessary. At this time, remaining capacity of the power of the main power supply 40 is provided to charge the power storage apparatus 41 as shown by arrow Y3 in FIG. 2 for future discharging.

Figure 3:
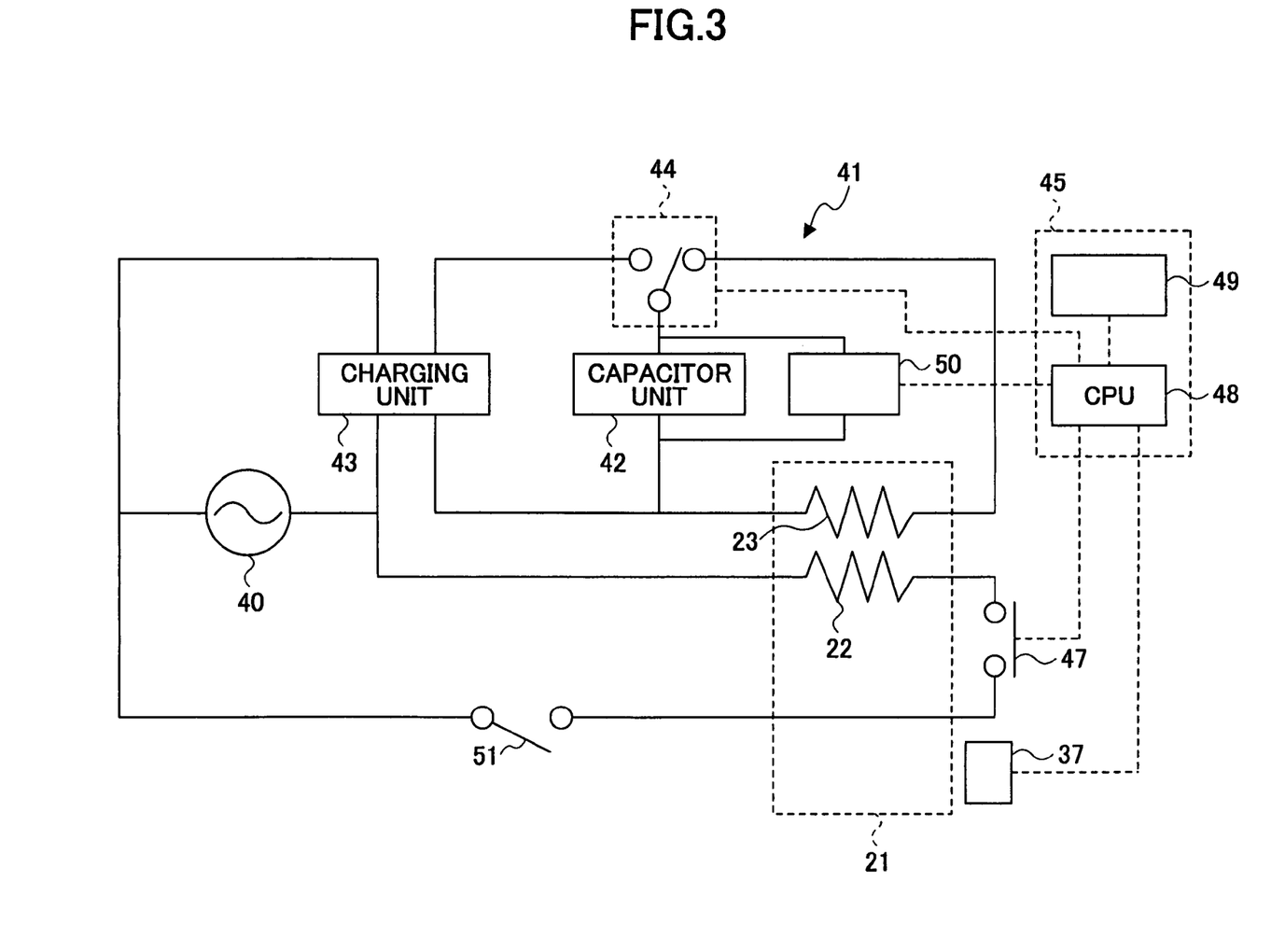
FIG. 3 is a circuit diagram showing a power storage apparatus of the image formation apparatus of FIG. 1.

Next, the structure and operations of the power storage apparatus 41 of the image formation apparatus 1 are explained in full detail with reference to FIG. 3.

As shown in FIG. 3, the power storage apparatus 41 includes a capacitor unit 42 (cell unit), to which power is charged and from which power is discharged, a charging unit 43 configured to charge the capacitor unit 42, a switching unit 44 configured to switch between charging and discharging states of the capacitor unit 42, a voltmeter 50 serving as a voltage detection unit configured to detect the voltage of the capacitor unit 42, and a main power switch 51.

As the capacitor unit 42 of the power storage apparatus 41, an electric double layer capacitor, a nickel-cadmium battery, etc., can be used. When the switching unit 44 is turned on to the discharging side as illustrated in FIG. 3, the capacitor unit 42 discharges and supplies power to the heater 23. When the switching unit 44 is turned on to the charging side, the charging unit 43 charges the capacitor unit 42, the charging unit 43 rectifying the AC power provided from the main power supply 40 into DC power. Here, the change of the switching unit 44 is performed based on a change signal sent from a CPU 48 based on a predetermined control program stored in a memory of a control unit 45. In addition, other than the structure of Embodiment 1 as described above, the switching unit 44 may be configured by an FET, etc., such that the capacitor unit 42, which is a secondary heater, discharges and provides the power to the heater 23.

Further, the control unit 45 controls the magnitude of the discharging power based on detection information of the thermistor 37. Further, the power storage apparatus 41 is charged at constant current or constant power. That is, the power storage apparatus 41 is controlled so that constant-current charging or constant power charging is carried out.

Further, the CPU 48 of the control unit 45 receives information concerning the voltage of the capacitor unit 42 from the voltmeter 50, and information concerning time from a timer 49, the timer 49 serving as a time detection unit. The CPU 48, the voltmeter 50 and the timer 49 serve as a degradation detection unit to detect degradation of the capacitor unit 42 by detecting that the power stored by the capacitor unit 42 falls below a predetermined value at a predetermined voltage. Details are described below.

The main power supply 40 is connected to the power storage apparatus 41, the heater 22 that serves as the main heater, the main power switch 51, a control switch 47, and other loads (not illustrated) of the image formation apparatus 1. When the main power switch 51 is closed, the power supply to the main heater 22, the charge of the power storage apparatus 41, and the like become possible. Here, the power supply to the heater 22 and the charge of the power storage apparatus 41 are performed based on a signal supplied by the control unit 45 based on the predetermined control program stored in the memory of the control unit 45. That is, when the control switch 47 is closed, the power is supplied to the heater 22. Further, when the switching unit 44 of the power storage apparatus 41 is connected to the charging unit 43, the power storage apparatus 41 is charged.

Next, controls that characterize Embodiment 1 are described with reference to FIG. 4 and FIG. 5.

According to Embodiment 1, the discharge power amount that the power storage apparatus 41 discharges is detected. Specifically, at the time of discharge, a time (discharge time), during which the voltage (discharging voltage) that remains in the capacitor unit 42 drops from a first discharging voltage (for example, 30V) to a second discharging voltage (for example, 20V) is measured using the voltmeter 50 and the timer 49. Since a constant-current charge or constant-resistance discharge is carried out, in the case that the first discharging voltage (discharge starting voltage) is the same (under the condition of the same voltage), the shorter the measured discharge time is, the smaller the discharge power amount is.

When the discharge time (which can be directly translated into the discharge power amount) detected in this way becomes below a predetermined value, the control unit 45 determines that the capacitor unit 42 is degraded. If the capacitor unit 42 is degraded, in comparison with the early stages of the service life, the discharge time becomes shorter. The discharge power that the capacitor unit 42 can provide to the heater 23 decreases, and the desired heating effect cannot be obtained. Further, if the capacitor unit 42 is degraded, compared with the early stages of the service life, the charge time become shorter. Therefore, the charge power (stored power) that is charged to the capacitor unit 42 decreases.

In this manner, degradation of the capacitor unit 42 can be detected comparatively simply by detecting the shortened discharge time by the voltmeter 50 and the timer 49.

In addition, it is desirable that the control unit 45 finally determines the degradation of the capacitor unit 42 after carrying out the detection of the discharge time being below the predetermined value two or more times. In this manner, incorrect detection of the degradation state can be prevented from occurring.

Further, determination of the degradation state of the capacitor unit 42 by the control unit 45 is desirably carried out in consideration of an operating environment of the power storage apparatus 41. For example, when the power storage apparatus 41 is used under a high temperature environment and the discharge time is short, based on predetermined compensation data, the detected discharge time is compensated for and converted to a normal temperature environment. In this manner, the shortening of the discharge time due to the environment can be separated from what is due to degradation. In addition, the information concerning the operating environment is obtained by an operating environment detection unit such as a thermometer, a hygrometer, and the like.

According to Embodiment 1, setting values concerning charging/discharging are adjusted such that the discharge power amount is increased, based on degradation detection of the capacitor unit 42, the detection being carried out by the CPU 48, the timer 49, and the voltage meter 50 serving as the degradation detection unit. Reference is made to FIG. 4.

Specifically, when the control unit 45 determines that a discharge time T1 is less than a predetermined time T2, a predetermined discharge starting voltage is adjusted to 33V from 30V.

Figure 4:
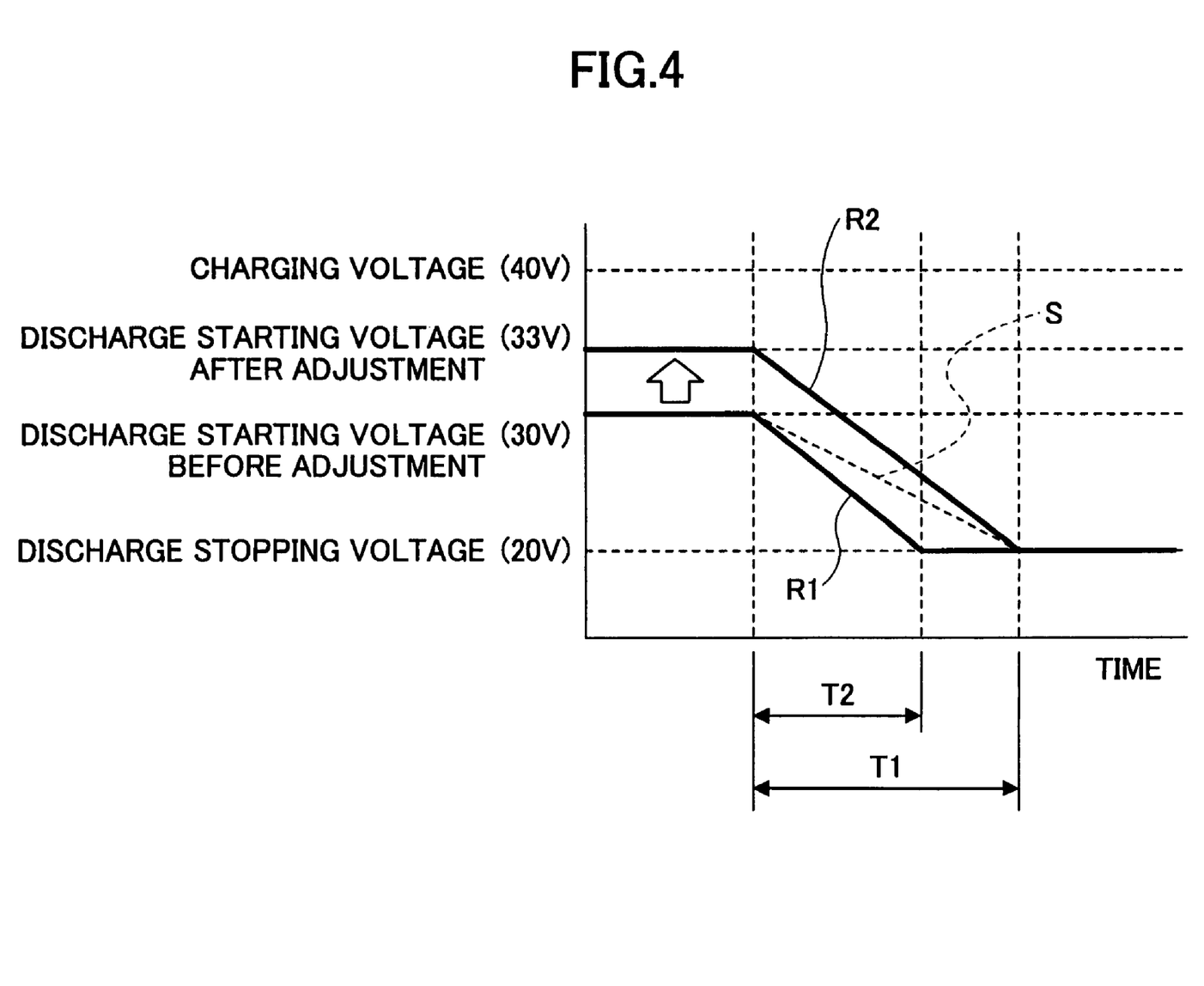
FIG. 4 is a graph showing changes of the charge time when a discharge starting voltage of the power storage apparatus of FIG. 3 is adjusted.

Details follow with reference to FIG. 4.

FIG. 4 gives a graph that shows change of the discharge time when adjusting the discharge starting voltage based on the degradation detection. In FIG. 4, the horizontal axis shows the time (detected by the timer 49), and the vertical axis shows the discharging voltage (which is in agreement with the charging voltage, and detected by the voltmeter 50) of the capacitor unit 42. Further, a dashed line S shows the discharge property of the capacitor unit 42 in the early stages of the service life of the capacitor unit 42, a solid line R1 shows the discharge property of the capacitor unit 42 that is degraded before adjusting the discharge starting voltage, and a solid line R2 shows the discharge property of the degraded capacitor unit 42 after adjusting discharge starting voltage.

Here, the "discharge starting voltage" is a voltage at which the discharge from the capacitor unit 42 is enabled, and it is a value set up for controlling purposes. That is, when the charging voltage of the capacitor unit 42 has not reached the discharge starting voltage, the capacitor unit 42 does not supply the discharge power to the heater 23. In other words, when the voltmeter 50 detects that the charging voltage of the capacitor unit 42 becomes greater than the discharge starting voltage, the switching unit 44 can be turned on to the discharging side.

Further, the charging voltage in FIG. 4 is a "target charge voltage" (the charging voltage of the capacitor unit 42 targeted when charging), and is a value set up for controlling purposes. That is, when there are no instructions from the control unit 45 to start discharging, and when the charging voltage exceeds the discharge starting voltage, the capacitor unit 42 is charged until the charging voltage reaches the target charge voltage.

Further, the "discharge stopping voltage" is a voltage at which the discharge from the capacitor unit 42 is stopped, and is a value set up for controlling purposes. That is, the capacitor unit 42 does not have to stop supplying the discharged power to the heater 23 while the discharging voltage of the capacitor unit 42 has not reached the discharge stopping voltage. Specifically, when the voltmeter 50 detects that the discharging voltage of the capacitor unit 42 is below the discharge stopping voltage, the switching unit 44 turns off the connection to the heater 23.

The dashed line S in FIG. 4 shows the case wherein the discharge starting voltage is set at 30V, and the discharge time is a period from when the discharging voltage is equal to the discharge starting voltage (30 V) until the discharging voltage becomes the discharge stopping voltage (20 V), which represents the case of the early stages of the service life of the capacitor unit 42, and is expressed by T1. The discharge power amount at this time is sufficient to supply the power to the heater 23 of the fixing roller 21.

With the passage of time, degradation of the capacitor unit 42 is detected as described above. At this time, as shown by the solid line R1, the discharge time becomes T2, which is less than T1. The discharge power amount at this time is insufficient to properly supply the power to the heater 23 of the fixing roller 21.

Accordingly, when the discharge time becomes below a predetermined value, and the degradation of the capacitor unit 42 is detected, the control unit 45 (serving as an adjustment unit) raises the setting value of the discharge starting voltage from 30 V to 33 V (in the direction indicated by a white arrow in FIG. 4). Then, as shown by the solid line R2, the discharge time from 33 V to 20 V becomes equal to the early stages discharge time T1. The discharge power amount at this time becomes almost equal to the initial available power amount, i.e., is sufficient to supply the power to the heater 23.

In addition, the setting value of the discharge starting voltage after adjustment is arranged to be no greater than the withstand voltage (the maximum voltage to be used) of the capacitor unit 42. Accordingly, reliable operation of the power storage apparatus 41 is ensured.

Figure 5:
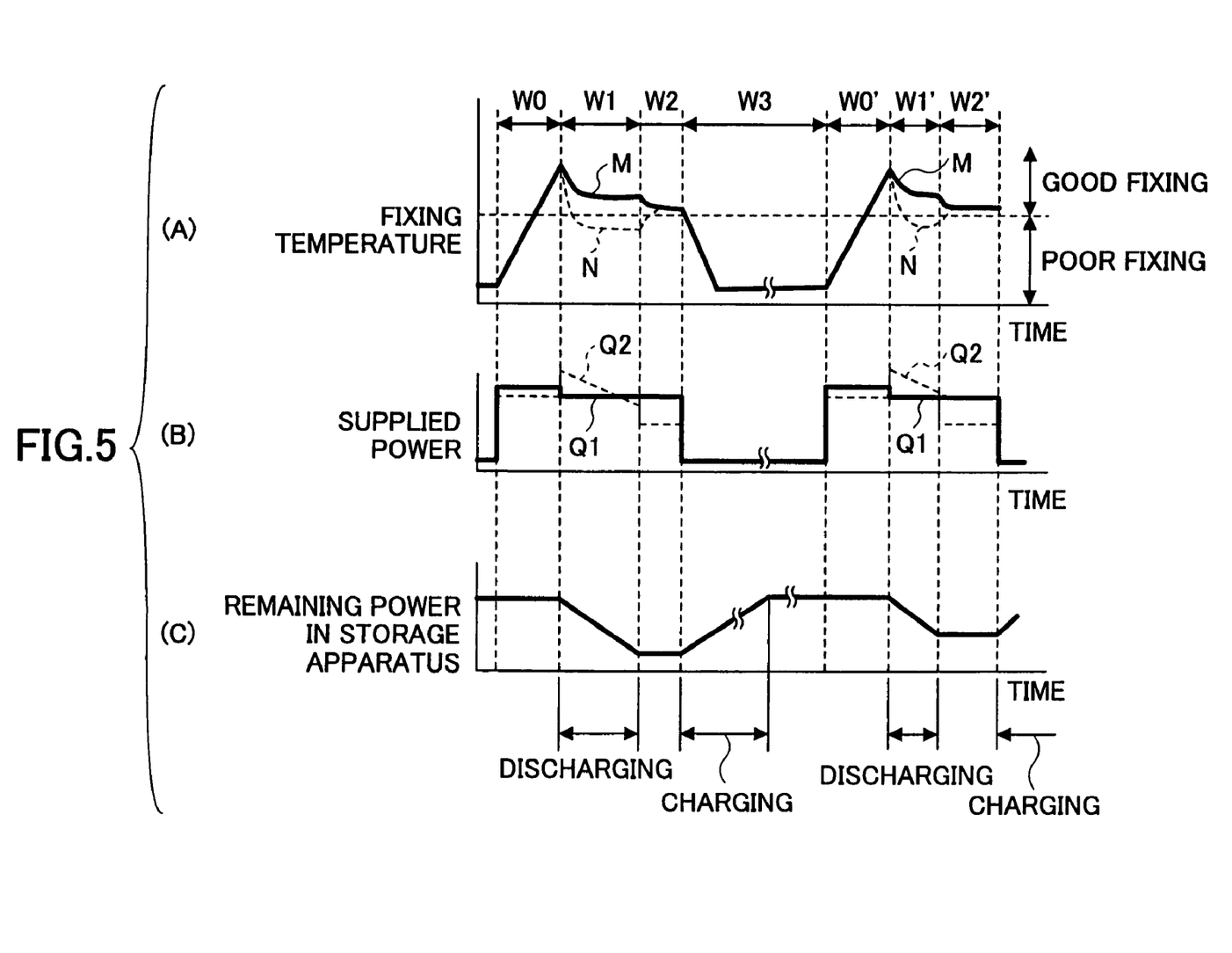
FIG. 5 gives graphs: namely, at (A), changes of the fixing temperature of the fixing apparatus are shown; at (B), changes of the supply voltage are shown; and at (C), the changes of power remaining in the power storage apparatus are shown.

FIG. 5 gives graphs showing state transitions of the fixing apparatus 20, the power storage apparatus 41, and the main power supply 40 when the image formation apparatus 1 of Embodiment 1 carries out image formation.

Here, the capacitor unit 42 of the power storage apparatus 41 is assumed be in a degradation state.

At (A) of FIG. 5, a time change of the fixing temperature of the surface of the fixing roller 21 detected by the thermistor 37 is shown. Therein, a solid line M shows the fixing temperature change in the case where the discharge starting voltage is adjusted for degradation, and a dashed line N shows the fixing temperature change in the case where the adjustment is not performed.

At (B) of FIG. 5, a time change of the supply power of the main power supply 40 and the power storage apparatus 41 is shown. Therein, a solid line Q1 shows the supply power change of the main power supply 40 to the image formation apparatus 1 (i.e., to all the loads including but not limited to the heater 22), and a dashed line Q2 shows the supply power change to the heaters 22 and 23 from the main power supply 40 and the power storage apparatus 41, respectively (note that this is the total of the supply power to the heaters 22 and 23).

At (C) of FIG. 5, a time change of a power amount remaining in the capacitor unit 42 of the power storage apparatus 41 is shown.

In all the graphs of FIG. 5, the horizontal axis shows the time. Specifically, time W0 is a preparation time, i.e., from the time when the image formation apparatus 1 is started after a state where the main power switch 51 is turned off for a long time. Time W1 is time wherein scanning of the document D by the document reading unit 2 and image formation are carried out. Time W2 is time wherein image formation is carried out based on the image information provided by the document reading unit 2 during the time W1. During the time W2, the document reading unit 2 does not perform scanning. Time W3 is time during which the image formation apparatus 1 is in the standby mode without performing image formation, while the main power switch 51 is kept turned on following the time W2.

Further, time W0' is time during which the image formation apparatus 1 is preparing for operation from the standby state. Time W1' is time during which scanning of the document D by the document reading unit 2 and image formation are carried out. Time W2' is time during which image formation is carried out without performing the scan by the document reading unit 2.

If the power storage apparatus 41 is degraded, unless the discharge starting voltage is adjusted as explained above with reference to FIG. 4, the power storage apparatus 41 cannot provide sufficient power during the times W1 and W1' for supplementing the power from the main power supply 40 to the fixing apparatus 20, with the operation of the document reading unit 2 ongoing, as shown by the dashed lines N at (A) of FIG. 5. For this reason, in the times W1 and W1', poor fixing due to temperature drop of the fixing roller 21 occurs. In addition, a dashed line that is parallel to the horizontal axis at (A) of FIG. 5 represents the minimum fixing temperature, below which poor fixing is produced.

On the other hand, as shown by the solid lines M at (A) of FIG. 5, even if the power storage apparatus 41 is degraded, by adjusting the discharge starting voltage as explained above with reference to FIG. 4, the power storage apparatus 41 is capable of supplementing the power from the main power supply 40 to the fixing apparatus 20 during the times W1 and W1'. That is, during the times W1 and W1', as shown at (C) of FIG. 5, the power storage apparatus 41 discharges, and as shown by the dashed lines Q2 at (B) of FIG. 5, the power supplied to the fixing apparatus 20 is increased. In this manner, during the times W1 and W1', the temperature dropping below the minimum fixing temperature can be prevented from occurring, and satisfactory fixing is obtained.

Since the drop of the discharge power amount accompanying the shortened discharge time is detected by the detection unit according to Embodiment 1 as explained above, the degradation state of the power storage apparatus 41 can be reliably managed. Furthermore, when the power storage apparatus 41 is degraded, the shortened discharge time is restored to the early stages level by adjusting the discharge starting voltage. The service life of the power storage apparatus 41 is prolonged by suppressing the discharge power drop and maintaining the performance of the power storage apparatus 41, even if the power storage apparatus 41 is degraded.

As described above, according to Embodiment 1, time of the residual voltage of the capacitor unit 42 descending from the first discharging voltage to the second discharging voltage when discharging is detected, and based on this, the degradation of the capacitor unit 42 is determined. On the other hand, the degradation of the capacitor unit 42 can also be determined by detecting a voltage change of the capacitor unit 42 in a fixed time. That is, since the discharging voltage drop per unit time when discharging becomes greater when the capacitor unit 42 is degraded as compared with the early stages, an amount of voltage drop (discharging voltage change) per unit time represents the degree of the degradation. When the discharging voltage change becomes greater than a predetermined value, it is determined that the capacitor 42 is degraded, and the setting value of the discharge starting voltage is adjusted upward as described above. This variation provides the same effect as Embodiment 1.

As described above, according to Embodiment 1, the change of the discharge power amount of the power storage apparatus 41 when discharging is detected, and the degradation of the capacitor unit 42 is determined based on this. A different method is possible. That is, a change of the charge power amount of the power storage apparatus 41 when charging may be detected, and the degradation of the capacitor unit 42 may be determined based on this. Furthermore, the changes of both charge amount and discharge amount may be detected, and the degradation of the capacitor unit 42 may be determined based on the changes. Since the power storage apparatus 41 is charged by a constant current control, if the capacitor unit 42 is degraded, the charge time becomes short, and a charged power amount declines. Therefore, a time (charge time) for the charging voltage of the capacitor unit 42 to rise to a second charge voltage from a first charge voltage is detected, and if the charge time becomes shorter than a predetermined value, it is determined that the capacitor unit 42 is degraded. Then, the control unit 45 serving as the adjustment unit raises the discharge starting voltage as at Embodiment 1. This variation also gives the same effect as Embodiment 1.

Embodiment 2

Embodiment 2 of the present invention is described in detail with reference to FIG. 6.

Figure 6:
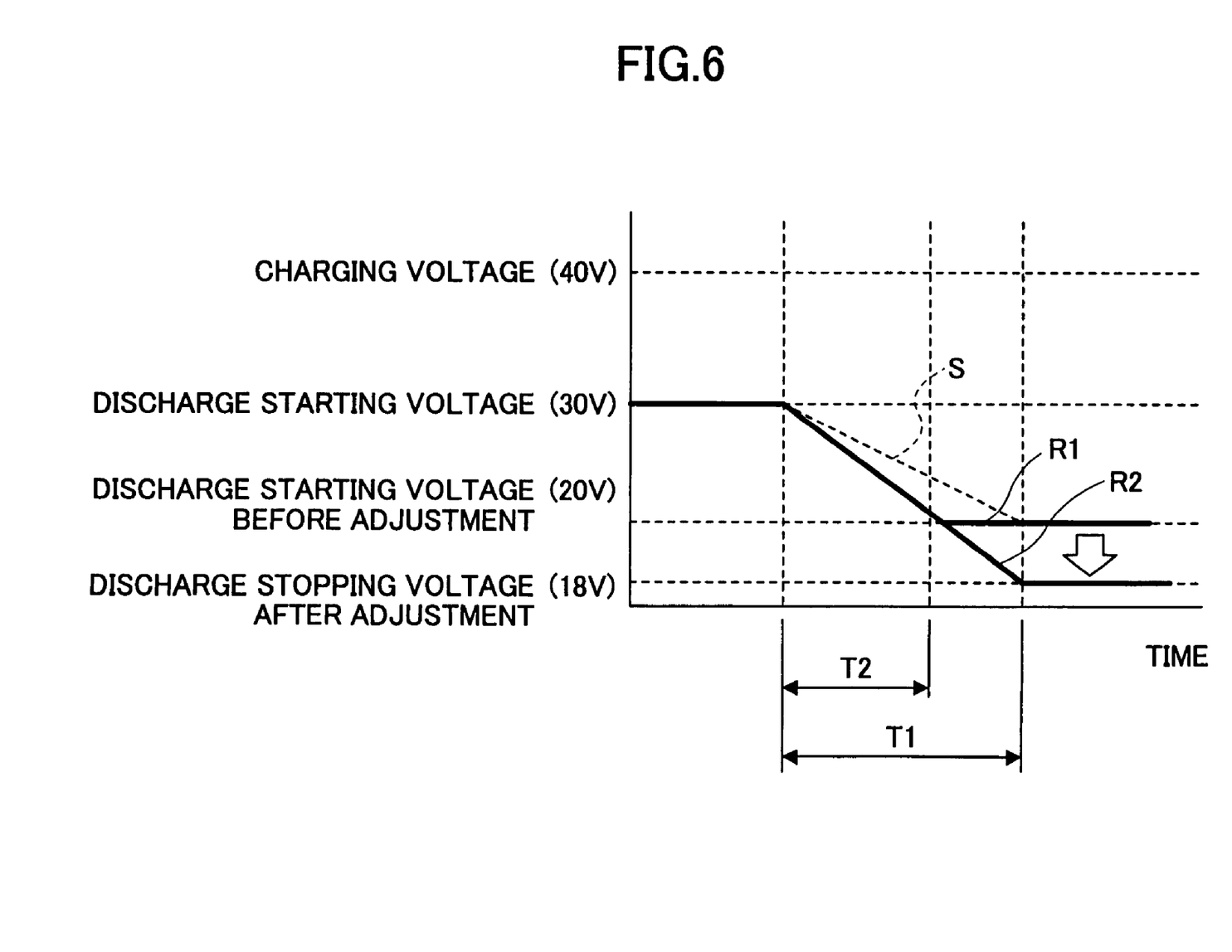
FIG. 6 is a graph showing changes of the discharge time when the discharge stopping voltage of the power storage apparatus is adjusted according to the second embodiment of the present invention.

FIG. 6 is a graph that shows an adjustment control that is carried out when the power storage apparatus 41 is degraded according to Embodiment 2. In the case that the capacitor unit 42 of the power storage apparatus 41 is degraded, the discharge stopping voltage is adjusted according to Embodiment 2, which is different from Embodiment 1 wherein the discharge starting voltage is adjusted.

FIG. 6 is a graph that shows a change of the discharge time when adjusting the discharge stopping voltage based on the same degradation detection carried out by the same degradation detection unit as Embodiment 1, the degradation detection unit being constituted by the CPU 48, the timer 49. In FIG. 6, the horizontal axis shows the time and the vertical axis shows the voltage of the capacitor unit 42. Further, a dashed line S shows the discharge property of the capacitor unit 42 in the early stages of the service life, a solid line R1 shows the discharge property of the capacitor unit 42 that is degraded before the discharge stopping voltage is adjusted, and a solid line R2 shows the discharge property of the degraded capacitor unit 42 after the discharge stopping voltage is adjusted.

As shown by the dashed line S, in the early stages, the discharge stopping voltage is set at 20 V, and the discharge time from the discharge starting voltage (30 V) to the discharge stopping voltage 20 V is T1. The discharge power amount at this time is sufficient to provide power to the heater 23 of the fixing roller 21.

With the passage of time, the capacitor unit 42 is degraded, which is detected as described above. At this time, the discharge time becomes shorter as shown by T2 (refer to the solid line R1). The discharge power amount at this time is insufficient to provide power to the heater 23 of the fixing roller 21.

At this instance (i.e., when the discharge time becomes shorter than a predetermined value at the same voltage, and degradation of the capacitor unit 42 is detected), the setting value of the discharge stopping voltage is adjusted downward to 18 V from 20 V by the control unit 45 as indicated by a white arrow in FIG. 6. Accordingly, as shown by the solid line R2, the discharge time from 30 V to the adjusted 18 V is made as long as T1. The discharge power amount at this time becomes almost equivalent to that of the early stages, and sufficient power can be supplied to the heater 23.

In addition, the setting value of the discharge stopping voltage is adjusted to be no less than the reverse voltage generating voltage (i.e., the minimum voltage to be used) of the capacitor unit 42. In this manner, the power storage apparatus 41 being reliable is offered.

Since the drop of the discharge power amount accompanying the shortened discharge time is detected by the degradation detection unit according to Embodiment 2 as explained above, the degradation state of the power storage apparatus 41 can be reliably managed. Furthermore, when the power storage apparatus 41 is degraded, the shortened discharge time is restored to that of the early stages by adjusting the discharge stopping voltage. In this manner, the service life of the power storage apparatus 41 is prolonged with the discharge power drop being suppressed, and the performance of power storage apparatus 41 being maintained, even if the power storage apparatus 41 is degraded.

Embodiment 3

Embodiment 3 of the present invention is described in detail with reference to FIG. 7.

Figure 7:
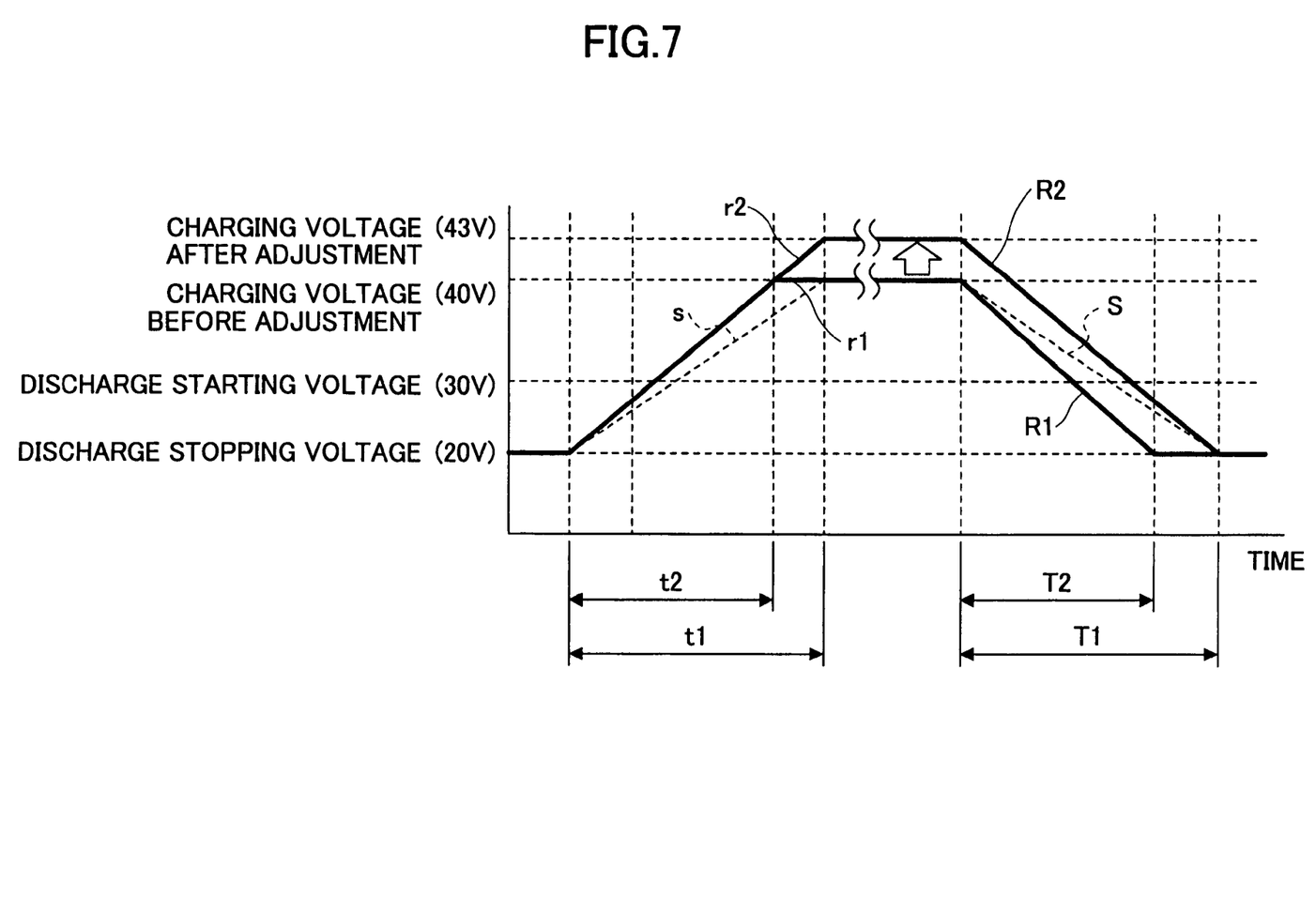
FIG. 7 is a graph showing changes of the charge time and discharge time when a target charge voltage of the power storage apparatus is adjusted according to the third embodiment of the present invention.

FIG. 7 is a graph that shows an adjustment control of Embodiment 3, which adjustment control is carried out when the power storage apparatus 41 is degraded. Embodiment 3 differs from Embodiments 1 and 2 in that Embodiment 3 adjusts a target charge voltage when the capacitor unit 42 of the power storage apparatus 41 is degraded, and that degradation of the capacitor unit 42 is also detected when charging in addition to when discharging.

According to Embodiment 3, the degradation of the capacitor unit 42 is detected, when charging and discharging, by the same degradation detection unit that includes the CPU 48, the timer 49, and the voltage meter 50 as Embodiments 1 and 2. FIG. 7 is a graph that shows changes of the charge time and the discharge time when the target charge voltage is adjusted based on the degradation state of the capacitor unit 42. In FIG. 7, the horizontal axis shows the time and the vertical axis shows the charging voltage and discharging voltage of the capacitor unit 42.

Further, a dashed line s shows the charging property of the capacitor unit 42 in the early stages of the service life, a solid line r1 shows the charging property of the capacitor unit 42 that is degraded before adjusting the target charge voltage, and a solid line r2 shows the charging property of the degraded capacitor unit 42 after adjusting the target charge voltage. Furthermore, a dashed line S shows the discharging property of the capacitor unit 42 in the early stages, a solid line R1 shows the discharging property of the capacitor unit 42 that is degraded before adjusting the target charge voltage, and a solid line R2 shows the discharging property of the degraded capacitor unit 42 after adjusting the target charge voltage.

As shown by the dashed line s, in the early stages, the target charge voltage is set at 40 V, and the charge time required to raise the voltage from the discharge stopping voltage (20V) to the target charge voltage (40V) is expressed by t1. The charge power amount at this time is sufficient as the amount of charge to be stored in the capacitor unit 42.

Further, as shown by the dashed line S, in the early stages, the target charge voltage is set at 40 V, and the discharge time during which the voltage drops from the target charge voltage 40 V to the discharge stopping voltage 20 V is expressed by T1. The discharge power amount at this time is sufficient to supply power to the heater 23 of the fixing roller 21.

The degradation of the capacitor unit 42 is detected based on the charge time being shortened at the time of charging, and the discharge time being shortened at the time of discharging. When the capacitor unit 42 is degraded, as shown by the solid line r1, the charge time t2 from the discharge stopping voltage (20V) to the target charge voltage (40V) becomes shorter than t1. The charged power amount at this time is insufficient as the amount of charge stored in the capacitor unit 42. Further, as shown by the solid line R1, the discharge time from the target charge voltage (40V) to the discharge stopping voltage (20V), which discharge time is expressed by T2, becomes shorter than T1. The discharge power amount at this time is insufficient to supply the power to the heater 23 of the fixing roller 21.

Thus, when at least one of the charge time and the discharge time becomes below respectively predetermined values at the same voltage, and degradation of the capacitor unit 42 is detected, the control unit 45 raises the setting value of the target charge voltage from 40 V to 43 V (the adjustment in the direction of the white arrow in FIG. 7). That is, as shown by the solid line r2, the charge time from the discharge stopping voltage 20 V to the adjusted target charge voltage 43 V becomes equivalent to t1, which is the charge time at the early stages. The charge power amount at this time becomes almost equivalent to that of the early stages, and is sufficient as the amount of charge stored in the capacitor unit 42. Further, as shown by the solid line R2, the discharge time from the target charge voltage after adjustment, i.e., 43 V, to the discharge stopping voltage 20 V becomes equivalent to T1, which is the discharge time of the early stages. The discharge power amount at this time is almost equivalent to that of the early stages, and is sufficient to supply the power to the heater 23.

In addition, the setting value of the target charge voltage is adjusted to be no greater than the withstand voltage (the maximum voltage to be used) of the capacitor unit 42. In this manner, the power storage apparatus 41 offered provides high reliability.

As described above, according to Embodiment 3, the drop of the charge power amount and the drop of the discharge power amount accompanying the short charge time and discharge time, respectively, are detected by the detection unit (which includes the CPU 48, the timer 49, and the voltage meter 50), and the degradation state of the power storage apparatus 41 is properly managed. Furthermore, when the power storage apparatus 41 is degraded, the shortened charge time and the shortened discharge time are restored to those at the early stages of the service life of the power storage apparatus 41 by adjusting the target charge voltage. In this manner, even when the capacitor unit 42 is degraded, the service life of the power storage apparatus 41 is prolonged, the charge power amount drop and the discharge power amount drop are prevented from occurring, and the performance of the power storage apparatus 41 is maintained.

As described above, according to Embodiments 1, 2 and 3, the control unit 45 controls based on the control program such that the degradation detection unit including the CPU 48, the timer 49, and the voltage meter 50 detects the degradation of the capacitor unit 42, and adjusts the setting values of such as the discharge starting voltage so that the discharge power amount is adjusted. In contrast to this, the adjustment can be manually performed. That is, when the degradation detection unit (the CPU 48, the timer 49, and the voltage meter 50) detects the degradation of the capacitor unit 42, a message to that effect is displayed on a display (not illustrated) of the image formation apparatus 1 such that a person, e.g., a service-person, is notified of the fact. The service-person adjusts the setting value of the discharge starting voltage of the power storage apparatus 41 by manually operating (external input) an operations unit (not illustrated) according to the displayed message.

Further, according to Embodiments 1, 2 and 3, the degradation of the capacitor unit 42 is detected by the degradation detection unit (the CPU 48, the timer 49, and the voltage meter 50 serving as the degradation detection unit), and the setting value of the discharge starting voltage, etc., is adjusted such that the shortened discharge time is restored. If the degradation of the capacitor unit 42 progresses further, and if the discharge time cannot be restored to that of the early stages of the service life by adjusting the discharge starting voltage, etc., the number of sheets of the recording medium P that are conveyed per unit time (CPM) to the fixing apparatus 20 can be controlled downward. Specifically, in order to reduce the CPM, an interval of sheet conveyance can be controlled while keeping the conveyance speed; or alternatively, the conveyance speed can be reduced while keeping the sheet conveyance interval. In this manner, the heat consumption (dissipation) of the fixing roller 21 per unit time is reduced, and the degraded power storage apparatus 41 can continue to provide services.

Further, Embodiments 1, 2 and 3 describe the power storage apparatus 41 serving as an auxiliary power supply at the time of starting the image formation apparatus 1, and when otherwise required. However, the present invention is not limited to this, but can be applied to any power storage apparatus that supplies power to any electrical load, providing the same highly efficient and long-life power storage apparatus as embodied as above.

Furthermore, it is evident that the present invention can be suitably modified within the limits of the technical thought of the present invention, besides as embodied above and as suggested above. The present invention is not limited to Embodiments described above. Further, the structure, the number of members, the position, the form, etc., as described above are not limited to what are described as Embodiments, but the present invention can be implemented with a suitable structure, a suitable number, a suitable position, a suitable form, etc.

Further, the present invention is not limited to these Embodiments, but variations and modifications may be made without departing from the scope of the present invention.

The present application is based on Japanese Priority Application No. 2004-027796 filed on Feb. 4, 2004 with the Japanese Patent Office, the entire contents of which are hereby incorporated by reference.

What is claimed is:

1. A power storage apparatus equipped with a capacitive unit that is configured to be charged and discharged, and supply power discharged from the capacitive unit to an electrical load, comprising:
   a degradation detection unit that detects whether energy stored by the capacitive unit is less than a predetermined magnitude at a predetermined voltage; and
   an adjustment unit configured to raise a predetermined discharge starting voltage of the capacitive unit when the degradation detection unit detects that the energy becomes less than the predetermined magnitude, wherein
   discharge is enabled when a charging voltage of the capacitive unit becomes equal to or greater than the predetermined discharge starting voltage.

2. The power storage apparatus as claimed in claim 1, wherein
   the discharge starting voltage is adjusted to be no greater than a withstand voltage of the power storage apparatus.

3. A power storage apparatus equipped with a capacitive unit that is configured to be charged and discharged, and supply power discharged from the capacitive unit to an electrical load, comprising:
   a degradation detection unit that detects whether energy stored by the capacitive unit is less than a predetermined magnitude at a predetermined voltage; and
   an adjustment unit configured to lower a predetermined discharge stopping voltage of the capacitive unit when the degradation detection unit detects that the energy becomes less than the predetermined magnitude, wherein
   discharge is stopped when a discharging voltage of the capacitive unit becomes less than the predetermined discharge stopping voltage.

4. The power storage apparatus as claimed in claim 3, wherein
   the discharge stopping voltage is adjusted to be no less than a reverse voltage generating voltage of the power storage apparatus.

5. A power storage apparatus equipped with a capacitive unit that is configured to be charged and discharged, and supply power discharged from the capacitive unit to an electrical load, comprising:
   a degradation detection unit that detects whether energy stored by the capacitive unit is less than a predetermined magnitude at a predetermined voltage; and
   an adjustment unit configured to raise a predetermined target charge voltage of the capacitive unit when the degradation detection unit detects that the energy becomes less than the predetermined magnitude, wherein
   the charging is carried out such that a charging voltage of the capacitive unit reaches the predetermined target charge voltage.

6. The power storage apparatus as claimed in claim 5, wherein
   the target charge voltage is adjusted to be no greater than a withstand voltage of the power storage apparatus.

7. A power storage apparatus equipped with a capacitive unit that is configured to be charged and discharged, and supply power discharged from the capacitive unit to an electrical load, comprising:
   a degradation detection unit that detects whether energy stored by the capacitive unit is less than a predetermined magnitude at a predetermined voltage, the degradation detection unit including,
      a voltage detection unit configured to detect a voltage of the capacitive unit, and
      a time detection unit configured to measure an elapse of time, wherein
   whether the capacitive unit is degraded is determined in consideration of an operating environment obtained from an operating environment detection unit when the degradation detection unit determines that the energy is less than the predetermined magnitude at the predetermined voltage.

8. An image formation apparatus, comprising:
   an imprint unit configured to form a toner image on a recording medium;
   a fixing apparatus configured to heat the toner image on the recording medium and fix the toner image to the recording medium;
   a power storage apparatus equipped with a capacitive unit that is configured to be charged and discharged, and supply power discharged from the capacitive unit to an electrical load including the fixing apparatus, and a degradation detection unit configured to detect whether energy stored by the capacitive unit is less than a predetermined magnitude at a predetermined voltage;
   a display unit, wherein a message is displayed when the degradation detection unit detects that the energy is less than the predetermined magnitude, the message indicating that the power storage apparatus is degraded; and
   an operations unit configured such that the setting value concerning charging and discharging of the capacitive unit is adjusted by externally receiving a setting value based on the message of the display unit.

9. An image formation apparatus, comprising:
   an imprint unit configured to form a toner image on a recording medium;
   a fixing apparatus configured to heat the toner image on the recording medium and fix the toner image to the recording medium;

a power storage apparatus equipped with a capacitive unit that is configured to be charged and discharged, and supply power discharged from the capacitive unit to an electrical load, and a degradation detection unit configured to detect whether energy stored by the capacitive unit is less than a predetermined magnitude at a predetermined voltage; and a changing unit that changes a number of recording medium sheets that are continuously conveyed to the fixing apparatus per unit time, wherein the number of recording medium sheets continuously conveyed to the fixing apparatus per unit time is reduced when the degradation detection unit determines that the energy becomes less than the predetermined magnitude.

10. The image formation apparatus as claimed in claim 9, wherein the number of recording medium sheets conveyed per unit time is reduced by increasing a conveyance interval of the recording medium sheets.

11. The image formation apparatus as claimed in claim 9, wherein the number of recording medium sheets conveyed per unit time is reduced by reducing a conveyance speed.

* * * * *